(12) United States Patent
Pluss

(10) Patent No.: US 8,872,065 B2
(45) Date of Patent: Oct. 28, 2014

(54) LASER MACHINING APPARATUS AND METHOD FOR THE MANUFACTURE OF A ROTATIONALLY SYMMETRICAL TOOL

(75) Inventor: Christoph Pluss, Burgdorf (CH)

(73) Assignee: EWAG AG, Etziken (CH)

( * ) Notice: Subject to any disclaimer, the term of this patent is extended or adjusted under 35 U.S.C. 154(b) by 556 days.

(21) Appl. No.: 13/065,041

(22) Filed: Mar. 11, 2011

(65) Prior Publication Data

US 2011/0220625 A1    Sep. 15, 2011

(30) Foreign Application Priority Data

Mar. 15, 2010   (DE) .......................... 10 2010 011 508

(51) Int. Cl.
*B23K 26/00* (2014.01)
*B23K 26/08* (2014.01)
*B23K 26/06* (2014.01)

(52) U.S. Cl.
CPC ............... *B23K 26/063* (2013.01); *B23K 26/08* (2013.01)
USPC .................................. 219/121.7; 219/121.78

(58) Field of Classification Search
USPC ................ 219/121.6, 121.61, 121.65–121.84
See application file for complete search history.

(56) References Cited

U.S. PATENT DOCUMENTS

| | | | |
|---|---|---|---|
| 4,628,179 A * | 12/1986 | Crahay .................... | 219/121.68 |
| 5,391,856 A * | 2/1995 | Minamida et al. ....... | 219/121.68 |
| 6,150,629 A * | 11/2000 | Sievers ..................... | 219/121.62 |
| 6,384,370 B1 * | 5/2002 | Tsunemi et al. ......... | 219/121.69 |
| 6,627,844 B2 * | 9/2003 | Liu et al. .................. | 219/121.71 |
| 7,029,996 B2 * | 4/2006 | Im et al. ......................... | 438/487 |
| 7,545,515 B2 * | 6/2009 | Goder et al. .................. | 356/601 |
| 8,168,917 B2 * | 5/2012 | Blakeley .................... | 219/121.6 |
| 2003/0117449 A1 | 6/2003 | Cahill et al. | |
| 2004/0140300 A1* | 7/2004 | Yoshikawa ............... | 219/121.84 |

FOREIGN PATENT DOCUMENTS

| | | |
|---|---|---|
| DE | 39 23 356 C1 | 2/1991 |
| DE | 198 60 585 A1 | 7/2000 |
| DE | 199 00 910 A1 | 7/2000 |
| DE | 102 04 993 A1 | 8/2003 |
| DE | 10 2006 005 401 A1 | 8/2007 |
| DE | 10 2007 012 816 A1 | 9/2008 |
| DE | 20 2008 017 745 U1 | 8/2010 |

* cited by examiner

*Primary Examiner* — Sang Y Paik
(74) *Attorney, Agent, or Firm* — R. S. Lombard; K. Bach

(57) ABSTRACT

A method and an apparatus for the manufacture of a tool from a blank, such as, a rotational tool which rotates about a longitudinal axis (L) which includes at least one cutting edge and a chip groove. Preferably, the rotational tool is in its operating area in a cross-section thereof radially symmetrical with respect to it's longitudinal axis (L) and manufactured from a cylindrical blank by laser ablation using a laser machining apparatus with a laser scanner with a predetermined pulse area. The laser beam impulses are directed via a positioning arrangement within the pulse area onto a plurality of impact locations disposed along a predetermined pulse path (B). This pulse area is moved, like a tool, along the surface of the blank to form the chip groove and the cutting edge by sublimation of the material.

20 Claims, 9 Drawing Sheets

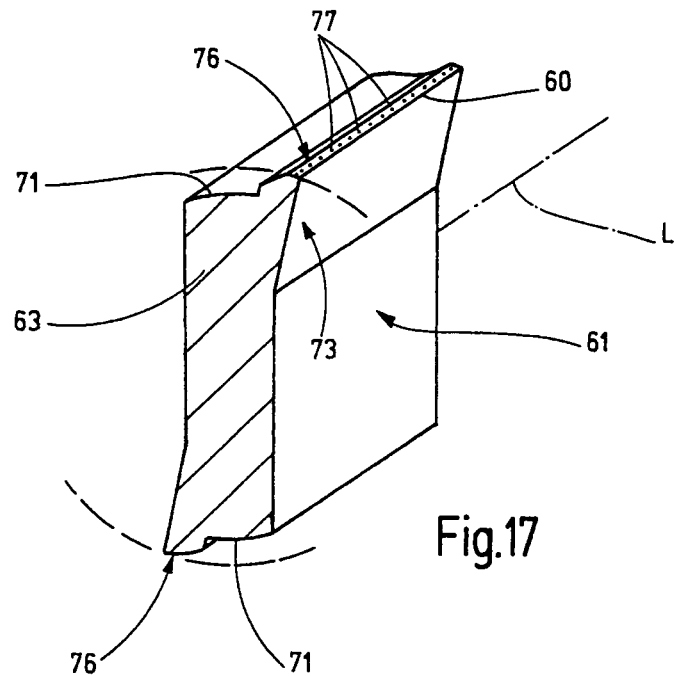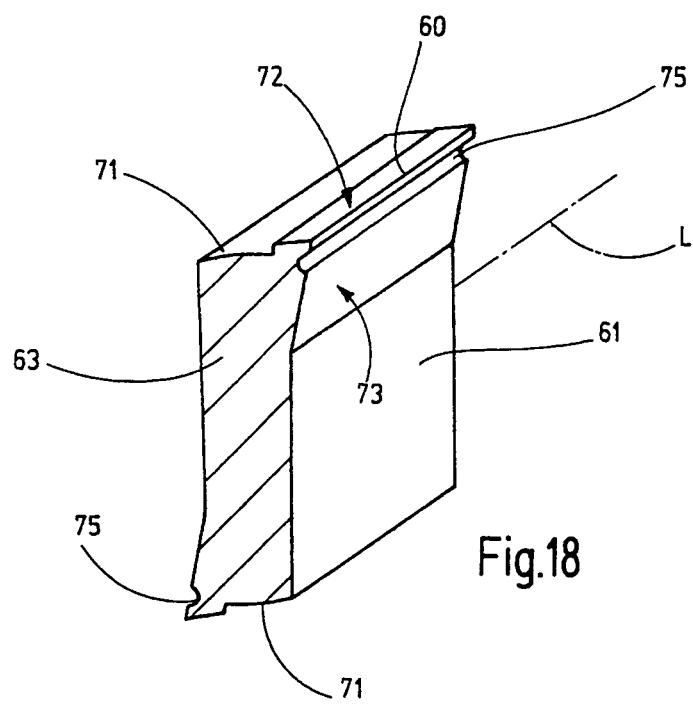

LASER MACHINING APPARATUS AND METHOD FOR THE MANUFACTURE OF A ROTATIONALLY SYMMETRICAL TOOL

CROSS-REFERENCE TO RELATED APPLICATION

This application claims the priority of German Application No. 10 2010 011 508.8-34 filed Mar. 15, 2010.

BACKGROUND OF THE INVENTION

The invention resides in a laser machining apparatus and a method for the manufacture of a tool, especially a rotationally symmetrical tool from a blank. The blank is to be provided with one or several chip grooves, cutting edges, cutting faces and end flanks. The blank may include also several material layers or several joined elements as for example a hard metal shaft and a diamond tool insert.

For the machining of such blanks various ablation methods are known, for example grinding. The grinding of very hard materials, such as polycrystalline diamonds (PKD) of CVD diamonds (Chemical Vapor Deposition) is limited in technical as well as economical respect. Particularly with very small dimensions only certain chip groove geometrics can be manufactured by grinding. In addition, the force effects on the blank are very large and may lead to undesired deformation. The laser ablation using short-pulsed lasers offers new possibilities of machining these materials economically in the manufacture of, for example, tools.

The manufacture of high-quality tools however is problematic. In the current state of the art, laser systems are known which scan the tool contour with the aid of a laser scanner wherein the blank is stationary with respect to the scanner. These laser scanners operate at very high scanning speeds during scanning of the blank by the individual laser beam impulses. However, the achievable accuracy does not comply with today's requirements. In addition, the surfaces and edges formed in the process deviate from a straight course and have an uneven jagged course.

Furthermore, laser machining apparatus are known where the laser is moved along machine axes relative to the blank. Although a higher accuracy and a higher quality of the surfaces and edges formed on the blank can be obtained in this way, the ablation rates which can be achieved thereby are low. This is because the dynamics and the speed of the machines axis are limited. For increasing the dynamics of the machine axes, large efforts and expenses are necessary which make the laser machining apparatus very expensive.

A method and apparatus for laser machining a blank are known for example from DE 299 08 385 UI. The apparatus includes a laser for generating laser impulses. Via a drive unit the laser and/or the tool blank holder are moved in the direction of and transverse to the optical axis of the laser. The laser beam is moved in the process along several adjacent or overlapping lines over the whole width of the surface to be removed. The material is therefore removed at the impinge locations of the laser impulses point-by-point. In order to obtain a continuous material ablation, the impinge locations overlap by 5-25%. With pulsed lasers of high frequency correspondingly large advancing speeds are herefor necessary. As already noted, the ablation rate in this procedure is low and machining time is correspondingly large.

In WO 2006/038017 A2, two different embodiments of a laser machining apparatus are described. In the first embodiment with the aid of a laser scanner a pulse area of several adjacent impingement locations for the laser impulses is formed. The material ablation occurs at the impingement locations of the laser impulses within the pulse area. In a second embodiment no real material ablation is effected, but the blank is severed. First a passage is drilled through the blank. After completion of the passage, an advance movement is initiated for cutting the blank in one sweep. This corresponds to the initially described variants of laser machining.

DE 10 2007 012 815 AI discloses a method wherein the impingement locations of the laser beam impulses are placed by means of a scanner along a grid pattern. Superimposed thereon, one-or two dimensional relative movement between the grid pattern and the impingement location can be performed. This superimposed relative movement should be faster than the path movement of the laser impulses by the scanner. How such a fast superimposed movement could be achieved is not disclosed. Known machine axes could not possibly provide therefor.

Based on these known methods and apparatus, the object of the invention is viewed in providing an improved method and laser machining apparatus for the manufacture of tools.

SUMMARY OF THE INVENTION

The invention resides in a method and an apparatus for the manufacture of a tool from a blank (27) wherein the tool is, in particular, a rotational tool which rotates about a longitudinal axis (L). The rotational tool includes at least one cutting edge (60) and a chip groove (61). Preferably, the rotational tool is in its operating area (63) in a cross-section thereof radially symmetrical with respect to the longitudinal axis (L) thereof. It is manufactured from a cylindrical blank (27) exclusively by laser ablation using a laser machining apparatus (20) by means of a laser scanner with a pulse area (55) of, for example, rectangular contour. The laser beam impulses (24) are directed within the pulse area (55) onto a plurality of impact locations (25) disposed along a predetermined pulse path (B). This pulse area (55) is moved, like a tool, along the surface (26) of the blank (27). Hereby the chip groove (61) and subsequently the cutting edge (60) are formed from the blank (27) by sublimation of the material. The relative movement between a tool holder (18) supporting the blank (27) and the laser head (19) delivering the laser beam impulses (24) is achieved by a positioning arrangement (30) having several axes.

In accordance with the present invention a pulsed laser is provided which generates laser beam impulses with a predetermined pulse frequency. Via a redirecting arrangement, the laser beam impulses are directed, especially in a fixed predetermined order, onto a multitude of impingement locations on the surface of the blank. These predetermined impingement locations form a two-dimensional pulse area on the surface of the blank. In this way, a sequence of laser beam impulses is generated, which are directed onto mutually different impact locations in the pulse area. This sequence is repeated in a predetermined order.

A positioning arrangement moves the blank and/or the redirecting arrangement, possibly together with the laser, in a relative movement direction along the edge or surface area to be formed. Herein the pulse surface moves along at the speed provided by the positioning arrangement for the relative movement on the surface of the blank. In this way, a material ablation is achieved in the area of the pulse surface which is moved relative to the blank like a tool. As a result, on one hand, a high ablation rate is achieved and, on the other hand, very accurate edge and surface courses with little deviations or inaccuracies of the desired course line can be produced. In the blank, at least a chip groove and at least one cutting edge is formed, wherein preferably the chip groove is formed first. In this way, additional shaping and, in particular, material ablating processes can be omitted. The tool can be manufactured from the blank exclusively by laser ablation. It is, in particular, possible to manufacture small rotating tools with a diameter of less than 2 mm or even less than 0.5 mm.

The invention combines the two laser machining methods which, so far, have been alternatively used. The fast scanner lens is used to form the pulse area. The scanner lens positions the laser beam impulses not along the desired contour of the surface or the edge to be formed, but it directs the laser beam impulses onto the impingement locations of the pulse area. The concurrent relative movement of the pulse area with respect to the blank via the machine axes ensures the desired accuracy in order to maintain the surface and edge course with only small deviation from the predetermined course.

During the ablation of the material for forming the chip groove, the direction of relative movement between the pulse area and the blank is reversed at the shaft-side end of the chip groove. The laser beam impulses are switched off during the reversal of the direction or the number and/or position of the impingement locations of laser impulses in the pulse area is changed in order to obtain the desired shape of the groove at the end of the groove.

In contrast, the relative movement between the pulse area and the blank is maintained while the cutting edge is formed, so that the pulse area on the surface of the blank is not stopped and therefore could be called a continuous relative movement. If, for example, during a reversal of the direction of the relative movement short resting pauses occur, the pulse area would be during such a resting phase outside the blank. As soon as even only a section of the pulse area impinges onto the surface of the blank, the relative movement is executed without stop.

Preferably, the chip groove or all chip grooves are first formed. In this way, the material ablation required for the subsequent forming of the at least one cutting edge can be reduced. Also, a cutting edge course with little unevenness or, respectively roughness is achieved thereby. After the chip groove has been formed and before the cutting edge is formed a release position recess can be formed adjacent the free area provided by the forming of the cutting edge. The release position recess facilitates the establishment of large clearance angles in the range of about 15° to 30°.

The intensity of the laser beam impulses for the forming of the cutting edge may be smaller than for the chip groove. In a preferred embodiment, the laser beam impulses are beam-homogenized. The energy distribution in the laser beam impulse is therefore uniform over the whole cross-sectional area of the laser beam impulse and consequently over the whole impact area. Heating of the blank during the tool manufacture can therefore further be reduced and thermal impairments and, particularly deformations can be avoided. This is particularly important in the manufacture of highly filigree tools for example, in connection with microtools.

The positioning arrangement may include an axis of rotation which coincides with the longitudinal axis of the cylindrical blank to be machined. The blank is rotated about the axis during the machining of the chip groove and or between the machining of two chip grooves. In this way also, chip grooves can be manufactured which extend, at least in sections, transverse to the longitudinal axis of the blank, for example, spiral-shaped chip grooves.

Preferably pulsed lasers with a frequency of between 1 and 10 MHz are used.

Preferably, the positioning arrangement adjusts, at least at times and at least during the manufacture of the chip surface or the free surface, an inclination angle greater than zero between the travel direction of the laser beam impulses and a surface area to be formed on the blank. The laser beam impulses extend herein preferably at a right angle to the direction of relative movement. The pulse area is oriented transverse to the surface area to be formed. By the laser beam impulses which are oriented at an inclination with respect to the surface area to be formed an additional free space is provided during material ablation which improves the removal of the plasma formed in the ablation area. At the beginning of the procedure the inclination angle may be zero and after reaching a predetermined state of the procedure, this angle may be increased.

The inclination angle may be adjusted, for example, depending on a material of the blank. The inclination angle may be in the area between 0 degree and 45 degrees, preferably in the range of 5 to 25 degrees. By means of the positioning arrangement, the inclination angle may also be changed during the machining of the blank and adjusted to a desired value. Especially if the blank consists of several layers of different materials and the material being machined change during the course of the machining the given inclination angle can be adjusted to different values in adaptation of the respective material.

The pulse area may have an essentially oblong contour. The impact locations forming the pulse area are arranged next to each other within an oblong contour so that several of the craters formed at the impact locations by the laser beam impulses contact the oblong contour. Expressed in another way, the outer impact locations of the pulse area are arranged along a rectangular line. Instead of the oblong pulse area, also other polygonal areas, elliptical or circular areas or annular segment-shaped areas may be provided. The shape of the pulse area may be adapted to the material ablation to be achieved and the contour desired contour of the workpiece that is to be formed from the blank.

The size of the pulse area can vary during the establishment of the chip groove. The pulse area may become, for example, smaller with increasing depth of the chip groove. In this way, different geometries of the chip groove can be formed in a simple manner. The pulse area can be reduced down to a pulse line or a single impact location.

The redirecting arrangement directs the laser beam impulses preferably toward impulse locations which are arranged along a predetermined pulse path. The pulse path depends on the shape of the pulse area and preferably has a meander-shaped or spiral course. Herein the pulse path may include an impact location as starting point and an impact location as end point wherein the end point is arranged at the edge of the pulse area which is assigned to the contour to be formed. The path section including the end point extends preferably parallel or tangential to relative movement direction. During the reset movement from the end point to the starting point a relatively large adjustment distance is passed which distance is substantially larger than the other adjustment paths between two subsequent impact locations along the pulse path. Since the accuracy of the positioning of the laser impulses is limited by the redirecting arrangement and the redirecting arrangement tends to overshoot, the direction of movement of the reset movement is directed away from the edge to be formed and/or the area. In this way, quantitative negative impacts on the contour being manufactured are avoided.

The distance between two subsequent impact locations along the pulse path may be predetermined as desired, in particular by an election of the adjustment of the impulse frequency and the adjustment speed of the redirecting arrangement.

Two subsequent laser beam impulses may be directed onto different impingement locations in the pulse area. Alternatively, it is also possible to direct an impulse series of two or more laser beam impulses onto the same impact location and only the next impulse series onto a different impact area. The energy, of the individual impulse or the energy of an impulse series directed onto one impact location is predetermined and is distributed in accordance with the number of the impulses used. The larger the number of the laser beam impulses included in an impulse series, the smaller is the energy contained in a single laser beam impulse.

The removal of the material part of the blank covering the surface area to be formed occurs advantageously layer-by-layer of several ablation layers extending essentially parallel to the pulse surface area. The thickness of the ablation layer—in the laser beam radiation direction—depends on the impulse frequency of the laser and the relative speed of the pulse surface area with respect to the blank. Layer thicknesses of several hundredth of a millimeter can be achieved. The ablation layer extend transverse in front of the surface area to be formed.

After the ablation of each ablation layer, the focusing of the laser beam impulses is adapted or, respectively adjusted preferably by way of a focusing lens system or the positioning arrangement.

Also, additional machining parameters may be provided in a material-dependent manner. For example, the intensity of the laser impulses may be varied during the ablation of the material. In this way, deviations from the desired tool shape can be reduced.

Via a process gas supply, a process gas stream can be directed onto the blank. The process gas stream is directed expediently at an inclined angle onto the pulse surface area. The plasma formed during the sublimation is removed from the machining area of the laser via the process gas stream. Preferably, the process gas supply includes several spaced process gas nozzles of which each directs a partial stream from different directions onto the machining area in the vicinity of the pulse surface area.

BRIEF DESCRIPTION OF THE DRAWINGS

Advantageous features of the invention are apparent from the drawings exemplary of the invention, in which:

FIG. 17 is a perspective partial representation of the operating area of the finished tool with a support base formed adjacent the cutting edge; and, FIG. 18 is a perspective partial representation of the operating area of the finished tool with a chip guide stage adjacent the cutting edge.

DETAILED DESCRIPTION OF VARIOUS EMBODIMENTS

Figure 1:
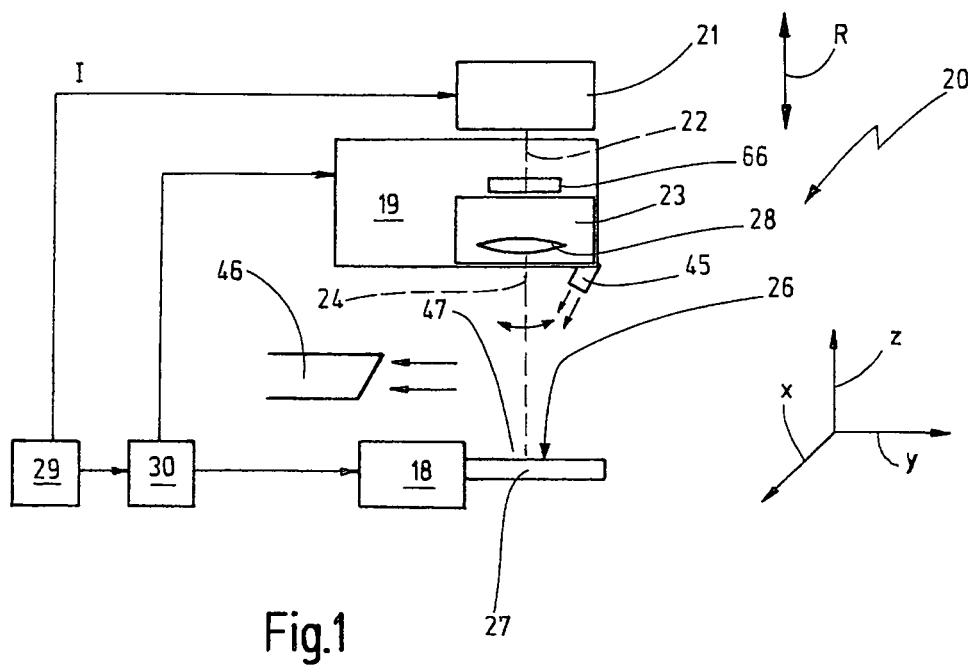
FIG. 1 is a block diagram of an exemplary embodiment of a laser machining apparatus.

FIG. 1 shows schematically a laser machining apparatus 20. The laser machining apparatus includes a pulsed laser 21 which generates a pulsed laser beam 22 and supplies it to a laser head 19 including a redirecting arrangement 23. The redirecting arrangement 23 is capable of changing the direction of the laser beam impulses provided, and as a result, directing the laser beam impulse 24 onto a predetermined impact location 25 on the surface 26 of a blank 27. The redirecting arrangement 23 may also be called a scanner arrangement. It also comprises a focusing lens system 28. The blank 27 is supported on a tool support 18 in an accommodation area 47.

The laser machining arrangement 20 further includes a control unit 29 which controls a positioning arrangement 30 via which a relative position between the laser head 19 and the blank 27 can be adjusted and changed. The number of linear axes and rotational axes of the positioning arrangement 30 may vary.

Figure 2:
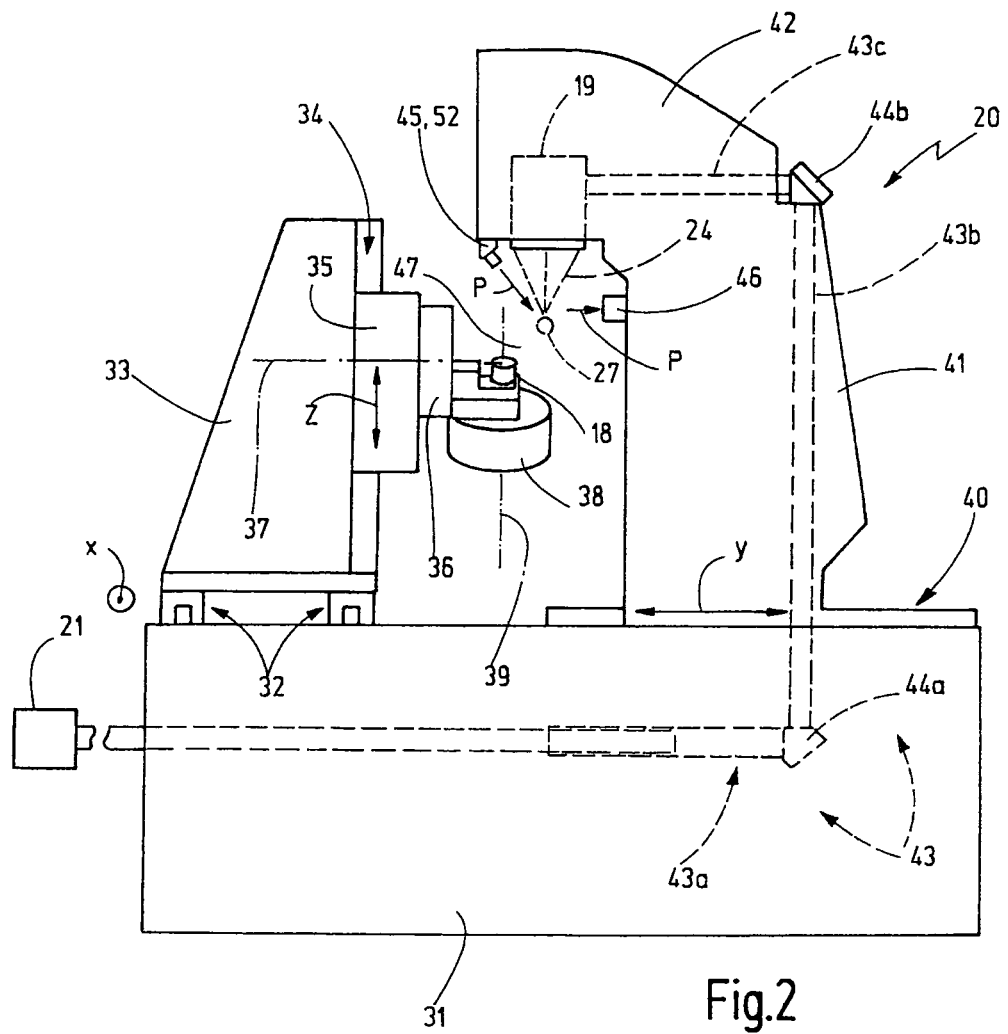
FIG. 2 is a schematic side view of an exemplary embodiment of a laser machining apparatus.

An exemplary embodiment of a laser beam machining apparatus is shown in FIG. 2 in a side view. The laser machining apparatus 20, a base element 31 which forms a machine bed. To this end, on the base element 31, first guide track 32 is mounted by way of which a carriage 33 is movable in a first direction X on the machine bed. On the first carriage 33, the tool holder 18 is supported so as to be movable in a second direction z. The second direction z extends at a right angle to the first direction x. On the first carriage 33 a second guide track 34 is therefore provided which extends in the second direction z and on which a second carriage 35 is movably supported. On the second carriage 35 a first pivoting arrangement 36 is disposed whose pivot axis 37 extends in a third direction y, which extends normal to the first direction x and also to the second direction y. The first pivot arrangement 36 carries a second pivoting arrangement 38 with a second pivot axis 39. The second pivot axis 39 of the second pivot arrangement 38 extends at a right angle with respect to the first pivot axis 37. The tool holder 18 for engaging the blank 27 extends in the exemplary embodiment co-axially with the second pivot axis 39. A cylindrical blank which is engaged in the tool holder 18 is therefore supported co-axially with the second pivot axis 39. When the second pivoting arrangement is rotated, the blank 27 rotates along its longitudinal axis L.

On the base element 31a further, third, guide track 40 is arranged on which a third carriage 41 which supports the laser head 19 is supported so as to be movable in the third direction y. The third carriage 41 includes an upper part 42 in which the laser head 19 is disposed. The laser beam impulses 24 are directed out in the direction of the base element 31 into the accommodation area 47.

The carriages 33, 35, 41 are, for example, linearly movable.

The laser beam generated by the pulsed laser 21 extends from the laser 21 to the laser head 19 within a tubular laser beam duct 43. A first duct section 43a extends in the base element 31 in the third direction Y. The first duct section 43a is in the form of a telescopic tube to facilitate adapting the length of the first duct section 43a to the movement of the third carriage 41 in the third direction Y. To the first duct section 43a a second duct section 43b is connected via a re-directing mirror 44a. The second duct section 43b extends out of the base element 31 into the third carriage 41 up to the upper part 42 thereof. There, it is connected, via a second redirecting mirror 44b to a third duct section 43c at the end of which the laser head 14 is arranged.

The positioning arrangement 30 includes a drive arrangement by which the carriages 33, 35, 41 and the pivoting arrangements 36, 38 are moved and positioned. In this way, the relative position and the relative movement between the laser beam impulses 24 and the blank 27 can be adjusted by the positioning arrangement 30 in accordance with the control signals provided by the control unit 29. As pivoting drives for example torque motors may be used and as drives for the movement of the carriages 33, 35, 41 preferably linear drives, for example, linear motor shafts and preferably direct drives are used. The positioning arrangement 30 provides for the relative movement between the laser head 19 and the tool holder 18 and consequently the blank engaged thereby. The relative movement can follow any path within the space defined by the three directions x, y, z In departure from the shown exemplary embodiment, the laser head 19 could also be arranged immovably with respect to the base element 31. The relative movement between the laser head 19 and the tool holder 18 in the third direction y could then be obtained by a further carriage disposed between the base element 31 and the first carriage guide track 32 or between the first carriage guide track 32 and the first carriage 33. It is in addition possible to provide a further, third, pivot axis and an associated pivoting arrangement. In more simple laser machining apparatus the number of machines axes may also be reduced.

The control unit 29 may also control the laser head 19, for example, in order to adjust the operating parameters for machining the blank 27 or to change them. The operating parameters may be, for example, the intensity I of the laser impulses 24 and/or the impulse frequency f of the laser 21 and/or the focal length of the focusing lens system 28. The frequency range can extend from 1 MHz to 10 MHz or it may comprise only a partial range within this frequency range.

The laser machining apparatus 20 further includes a process gas supply 45 as well as a process gas suction devise 46 for generating a process gas stream P in the accommodation area 47. The process gas stream P serves for the removal of the plasma formed during the laser ablation by sublimation of the material. A plasma cloud in the area of the blank 27 being machined can reduce the efficiency of the material ablation since part of energy contained in the laser beam impulses is absorbed already by the plasma. By the removal of the plasma from the blank 27 an uninhibited material ablation by the laser beam impulses is ensured.

As seen in the second direction z, the process gas suction gas device 46 is for example, arranged at the level of the blank 27 to be machined which is shown in FIG. 2 in a possible operating position by dashed lines. The process gas stream P extends from the blank 27 to the process gas suction device 46 about in the third direction y. The process gas supply 45 is arranged preferably adjacent the laser head 19. As shown in FIG. 2, the laser head 19 and the process gas supply 45 are arranged side-by-side on the upper part 42 of the third carriage 41. The process gas discharged from the process gas supply 45 is therefore directed toward the blank 27 to be machined at an angle. The process gas stream P extends between the process gas supply 45 and the blank 27, for example, at an angle with respect to a plane which is defined by the first direction x and third direction y. The process gas supply 45 may include one or several process gas nozzles 52. In the exemplary embodiment described here, three process gas nozzles 52 are arranged side-by-side in the first direction x, a graphic symbol depicting such multiple process gas nozzles (52) appears in the drawings in FIG. 2 since their side-by-side arrangement, i.e., one behind the other, as indicated in FIG. 2, the first direction x is into the drawing sheet of FIG. 2. Each process gas nozzle 52 discharges a partial stream which is directed toward the vicinity of the area of the blank 27 being machined. It is also possible to provide pivotable process gas nozzles 52 which are adjustable for controlling the flow direction of the process gases out of the nozzles 52. The process gas section device 46 is movable together with the third carriage 41 in the third direction y. Additionally, the process gas suction device 46 may also be supported on the carriage 41 so as to be adjustable in the second direction z and/or in the first direction x.

Figure 15:
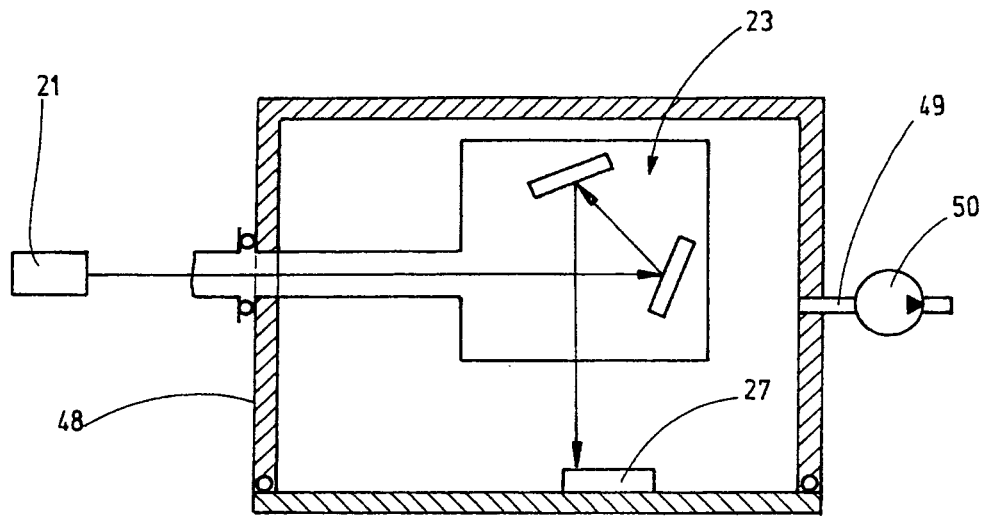
FIG. 15 is a schematic representation of another embodiment of the laser machining apparatus including a vacuum chamber in a schematic from similar to a block diagram.
Figure 16:
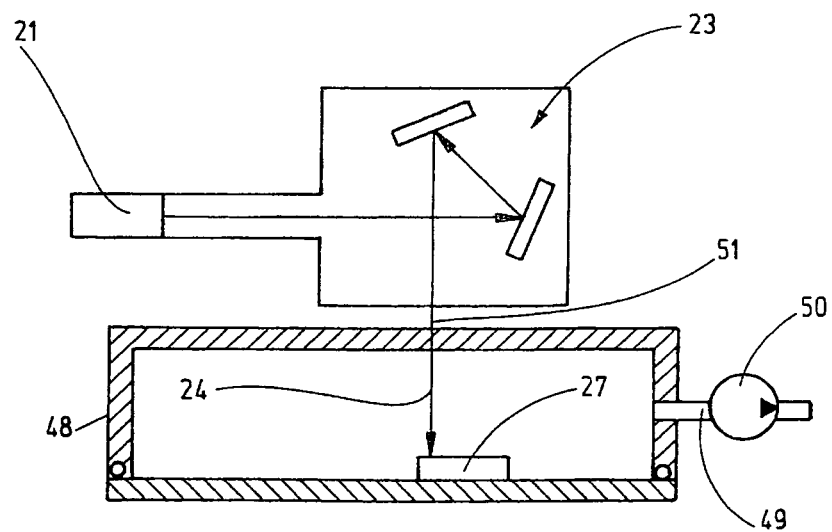
FIG. 16 is a schematic block diagram-like representation of a variant of the exemplary embodiment according to FIG. 14.

In the exemplary embodiments as shown in FIGS. 15 and 16 alternatively for the generation of the process gas stream P a vacuum chamber 48 is provided in which the tool holder 18 and the accommodation area 47 for the blank 27 are disposed. Via a suction line 49, the vacuum chamber 48 is connected to a vacuum pump 50 so that a vacuum can be established in the accommodation area 47. The redirecting arrangement 23 may then be arranged within the vacuum chamber 48 (FIG. 15) or, alternatively, outside the vacuum chamber 48 as it is shown, for example, in FIGS. 2 and 16. In this case, the vacuum chamber 48 needs to be in the area of the entrance location 51 of the laser impulses 24 transparent for the laser wave length employed.

Figure 6:
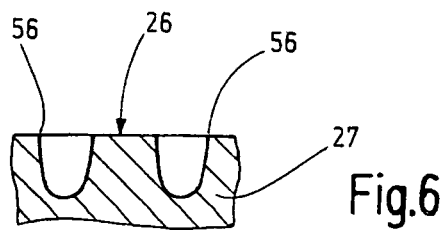
FIG. 6 is a schematic sectional view of two impact areas.

With the aid of the redirecting arrangement 23, the laser beam impulses 24 are directed in the area of the pulse area 55 onto the surface 26 of the blank 27. A laser beam impulse 24 impinges at the impact location 25 onto the surface 26 and causes there a material ablation whereby a funnel-shaped crater 56 is formed as it is schematically shown in FIG. 6. As impact location 25, in this case, the center point or, respectively, the center axis of the crater is designated. A plurality of predetermined spaced impact locations 25 forms the pulse area 55.

The control arrangement 29 provides for the redirecting arrangement 23 a pulse path B for arranging subsequent impact locations 25. The redirecting arrangement 23 directs the laser beam impulses 24 one after the other onto the impact locations 25 of the pulse path B. The course of the pulse path B depends on the shape of the pulse area 55 and, in the oblong pulse area 55 according to FIG. 3, has a meander-form, which is comprised of straight-line path sections 57. An impact location 25 at a corner point of the pulse area 55 forms a starting point S which is spaced from the edge 60 or the free surface 62'. Beginning at the starting point S, the laser beam impulses 24 are placed along the pulse path B up the impact location 25 at the diagonally opposite corner of the pulse area, which works the end point E of the pulse path B.

Figure 3:
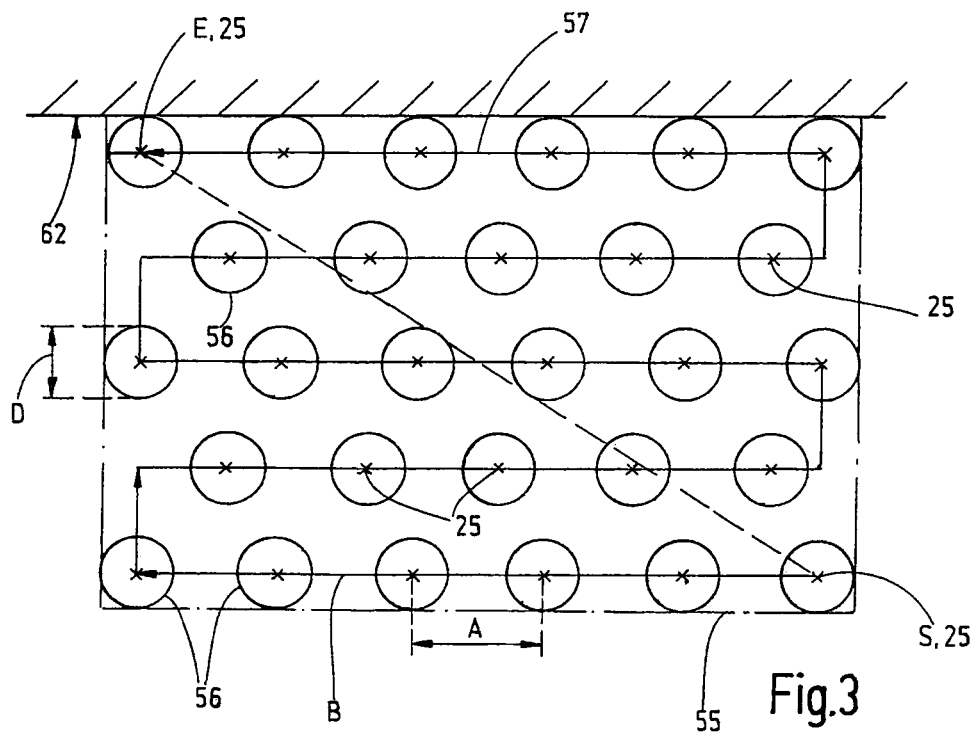
FIGS. 3-5 are various shapes of pulse surface areas.

The path section 57 of the pulse path including the end point E extends in the manufacture of a cutting edge parallel to the chip or free surface 62' adjacent the edge 60. This path section 57 borders directly the free surface area 62' or edge 60 to be formed. Upon reaching the end point E, a reset movement is initiated in the redirecting arrangement 23 and the laser beam impulses 24 are then again placed on the pulse path B beginning with the starting point S. The reset movement occurs in a direction away from the contour 60, 61 to be formed. It is shown in FIGS. 3 to 5 by a dashed-line arrow.

The distance A between two subsequent impact locations 25 along the pulse path B is determined by the impulse frequency f of the laser 21 and the adjustment speed of the redirecting arrangement 23. During changes of the directions of the pulse path B the distance A may also vary.

Figures 4, 5:
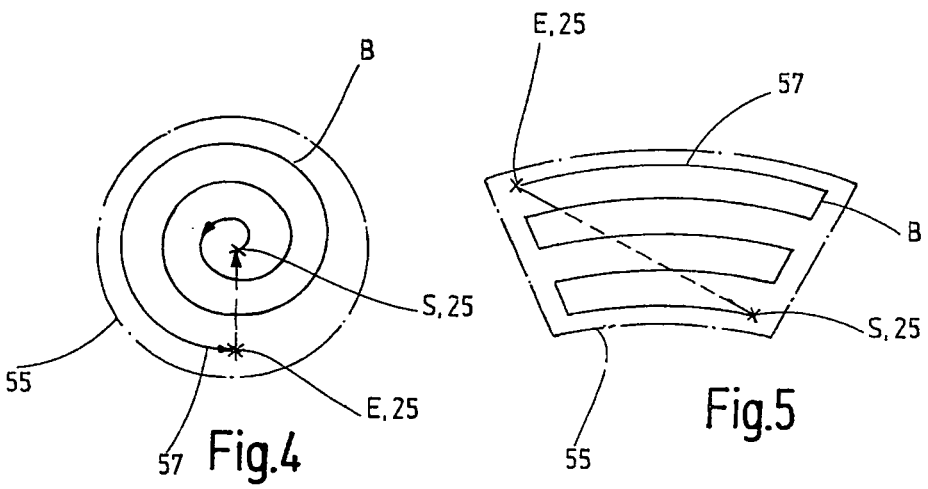

If a pulse area 55 has a round, elliptical or another curved shape, the path section including the end point E may also extend tangentially with respect to the contour 60, 61 to be formed (FIG. 4). The pulse path B is in this case spiral-shaped. The pulse area 55 may also be in the form of ring segments (FIG. 5).

Alternatively to aligning the subsequent laser beam impulses 24 along a meander or snake-like path, also other pulse paths stored in the control unit 29 may be selected, wherein all the defined impact locations 25 are visited one after the other, from the starting point S to the endpoint E. Preferably the starting point S and the end point E are spaced from each other as much as possible and the process gas flows from the end point E toward the staring point S.

Figure 14:
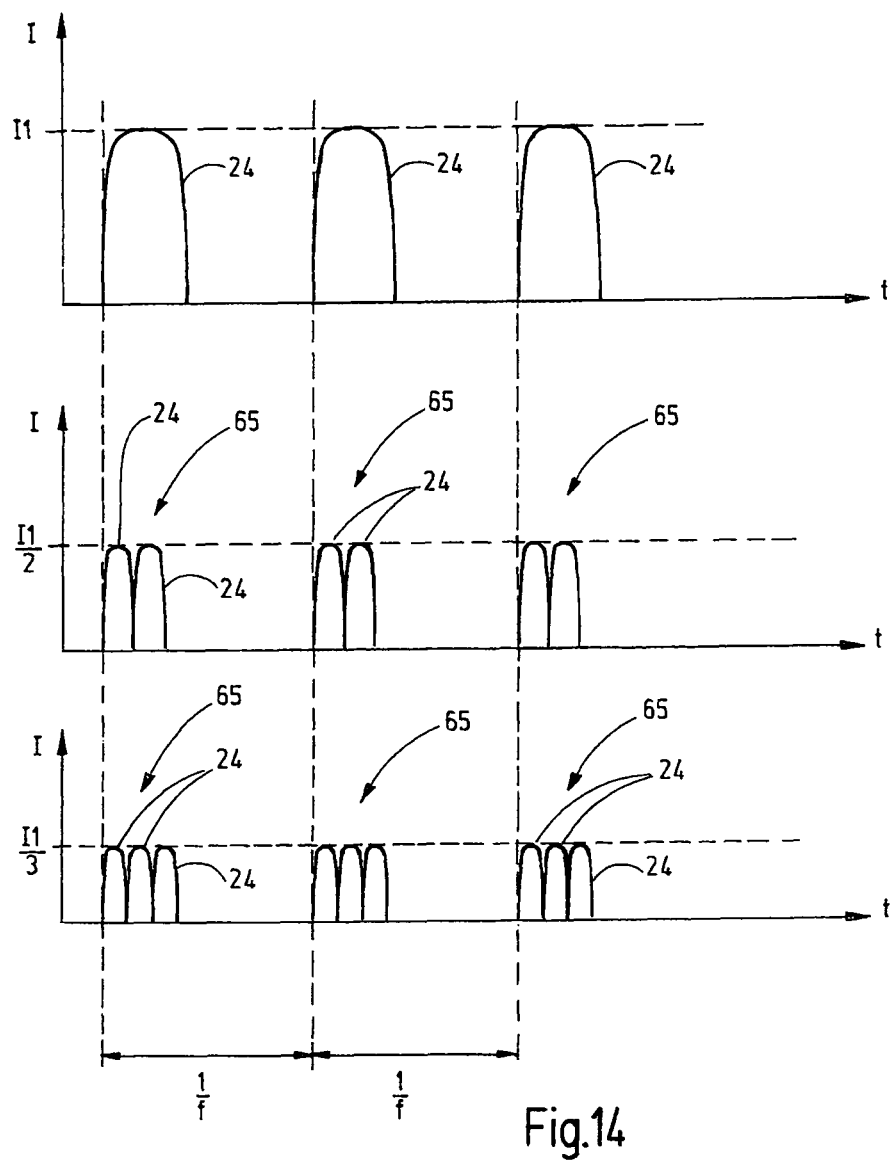
FIG. 14 depicts graphically the intensity of laser beam impulses or respectively series of impulses over time.

In the preferred exemplary embodiment only one laser beam impulse 24 is directed onto each impact location 25 whereas the next laser beam impulse 24 is directed onto another impact location 25 of the pulse area 55. Such a procedure is shown in FIG. 14 in the upper part of the Figure. The time distance between two subsequent laser beam impulses 24 is the reverse of the momentary impulse frequency f of the laser 21. The pulsed laser 21 may be in the form of a nano-, a piko- or a fempto second laser.

If subsequent laser beam impulses 24 are directed onto different impact locations 25 these laser beam impulses 24 have the intensity I1. As shown in the other two diagrams of FIG. 14 also two or more laser beam pulses 24 may be directed onto an impact location 25, before the next impact location 25 is addressed. In other words, the redirecting arrangement 23 directs onto an impact location 25 an impulse series 65 of several laser beam impulses 24 before the subsequent impulse series 65 is directed onto another impact location 25. The energy contained in an impulse series 65 and effective on the impact location 25 should in this case correspond to that of a single laser beam impulse 24 with the intensity I1. Therefore the intensity I of an individual laser beam impulse 24 of an impulse series 65 is reduced. In the exemplary embodiment shown herein, the overall intensity I of a laser impulse series 65 is constant. Therefore, the intensity I of an individual laser beam impulse 24 is an impulse series 65 corresponds to the quotient of intensity I1 divided by the number of the laser beam impulses 24 contoured in the impulse series 65.

The diameter D of the crater 56 depends on the effective diameter of the laser beam impulse 24 at the impact location 25, which is predetermined by the focusing lens system 28 and preferably adjusted to a certain value but which also may be changed during machining.

The laser head 19 may also include an arrangement 66 for beam homogenization of the pulsed laser beam 22. The arrangement 66 for beam homogenization provides for a more homogenous energy distribution within the cross-sectional area of the laser beam impulse. As arrangement 66 refractive or diffractive beam homogenizers may be used. It is, in this way, also possible to achieve oblong intensity profiles with inhomogeneities of less than 2%. With the use of such an arrangement 66 for beam homogenization the impulse flanks of the individual laser beam impulses 24 are very steep as it is shown schematically in FIG. 14. Around the impact location 2 in the area of the laser spots, a uniform sublimation of the material to be ablated is achieved. In this way, heating of the blank 27 being machined is further reduced.

While by means of the redirecting arrangement 23, a two-dimensional spatially limited pulse area 55 is machined the positioning arrangement 30 causes at the same time a relative movement of the pulse area 55 on the surface 26 of the blank 27. In other words, the material ablation area formed by the pulse area 55 with the plurality of impact locations 25 of the laser beam impulses 24 moves with a predetermined relative speed V rel.

Figure 7:
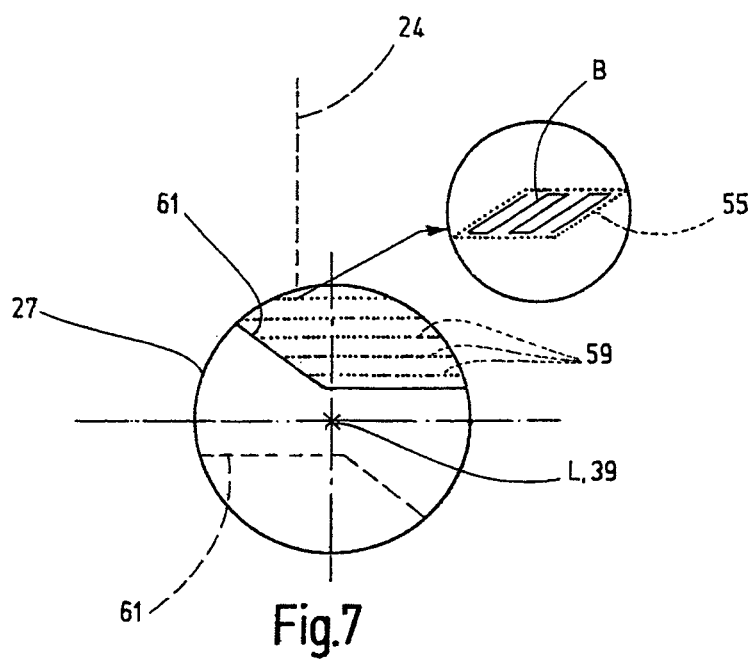
FIG. 7 is a representation of the blank in cross-section during the manufacture of a chip groove.
Figure 8:
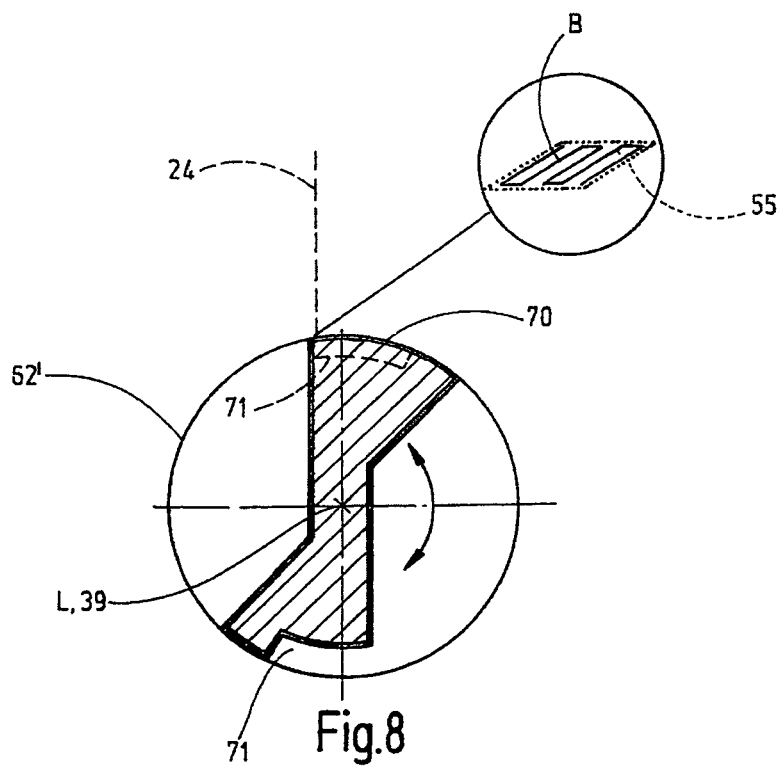
FIG. 8 is a representation of the blank in cross-section during the material ablation at the outside before the forming of the cutting edges.
Figure 9:
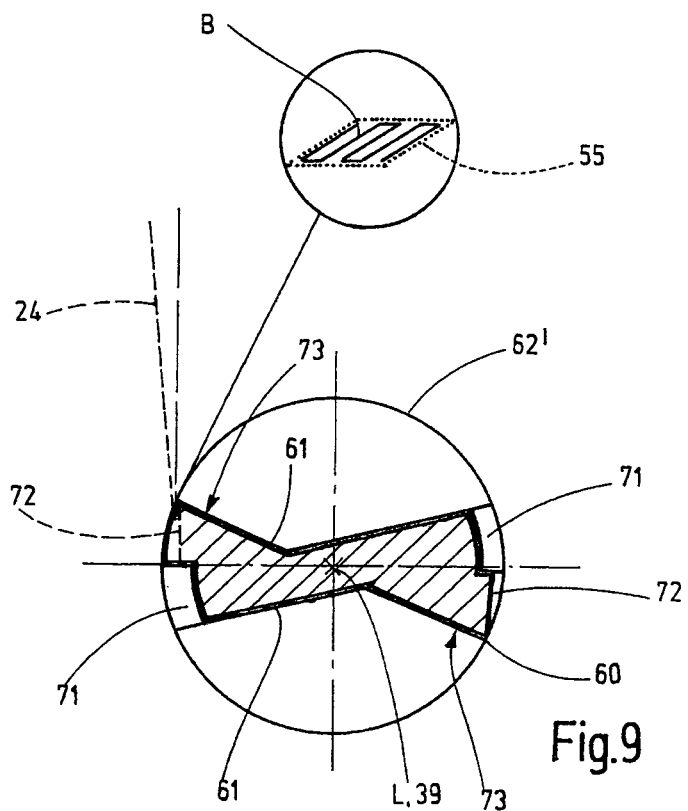
FIG. 9 is a representation of the blank in cross-section during the manufacture of a cutting edge.

In the FIGS. 7 to 9 three method steps are shown for forming from a cylindrical blank 27, a rotational tool with one or several cutting edges 60, and one or more chip grooves 61.

Figure 10:
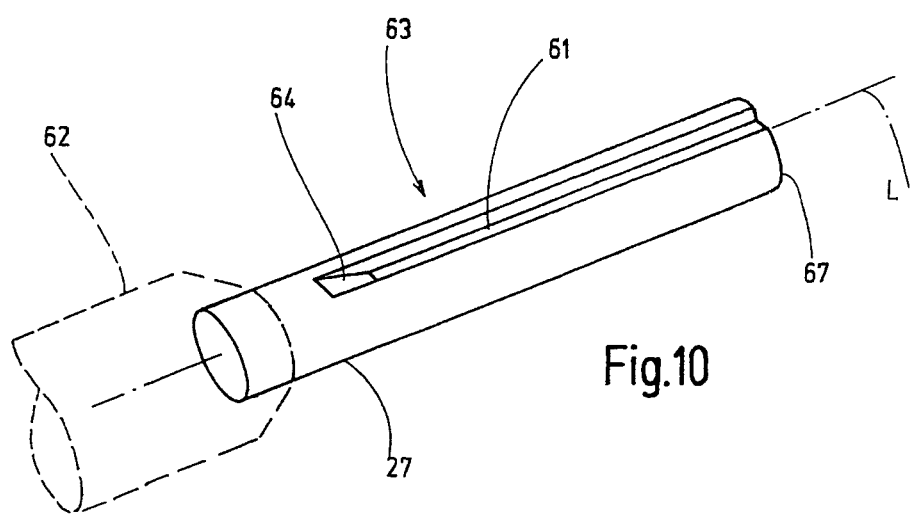
FIG. 10 is a blank in a perspective schematic representation with a chip groove extending in the direction of the longitudinal axis.
Figure 11:
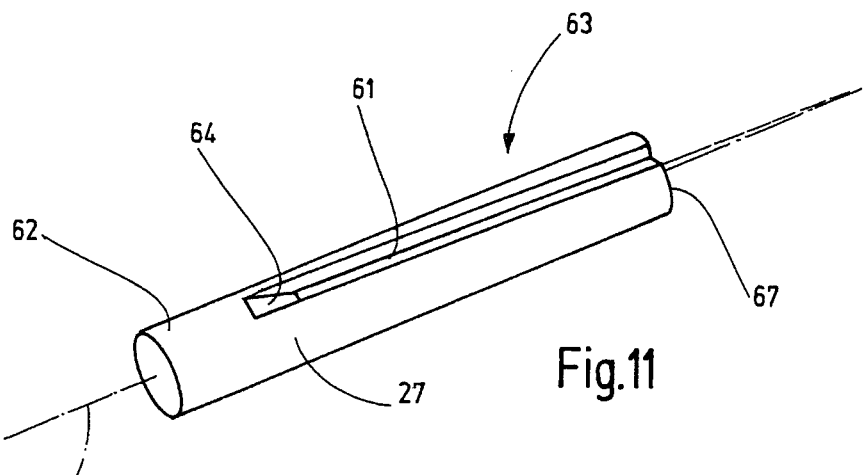
FIG. 11 is a blank in a perspective schematic representation with a chip groove extending at an angle to the longitudinal axis.
Figure 13:
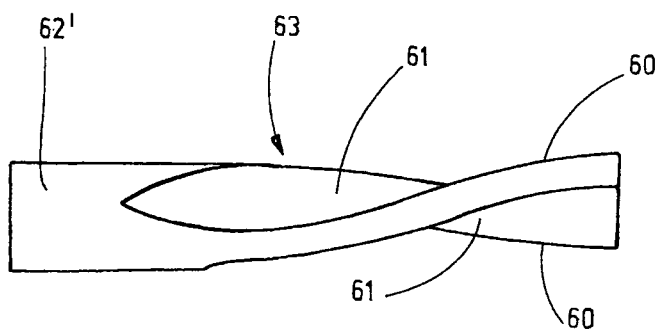
FIG. 13 is a schematic side view of a blank with a spiral chip groove.

In the first method step according to FIG. 7, a chip groove 61 is formed into the blank 27. To this end, the material is removed, layer by layer 59, by a movement of the pulse area 55 over the surface of the blank 27 so the desired chip groove 61 is formed. The size of the pulse area 55 may be changed. In this way, the size of the pulse area 55 can be adapted to the desired shape of the chip groove 61 to be formed. For example, in connection with a chip groove 61 which is to narrow down toward the groove bottom the size of the pulse area 55 may become smaller from one ablation layer 59 to the next ablation layer 59. With the pulse area 55 being moved along the blank 27, the chip grooves 61 can be given almost any shape. Edges with obtuse or with pointed angles can be formed in the chip groove 61. Also undercuts on one or several groove flanks are possible. In FIGS. 10, 11 and 13 different forms of chip grooves 61 are schematically shown.

The chip groove 61 may extend parallel to the longitudinal axis L (FIG. 10). Different herefrom, the chip groove 61 may also extend at an angle relative to the longitudinal axis L of the cylindrical blank 27. In the embodiment of FIG. 11, the chip groove 61 extends along a straight line wherein the edges of the groove form an acute angle with a line extending parallel to the longitudinal axis L of the cylindrical blank 27. In another tool form the chip grooves 61 may extend spirally in the direction of the longitudinal axis L. Such an embodiment is shown schematically in FIG. 13.

The tool to be manufactured from the blank 27 includes a shaft 62 from which the chip groove 61 and the working area 63 with the cutting edge 60 extend. The shaft 62 and the working area 63 may be two different parts which are joined to each other. For example, the blank 27 may be in the form of a pin which is disposed in a hard metal shaft 62. The pin may be a diamond tool insert of a polycrystalline diamond (PKD) or a CVD-diamond (Chemical Vapor Deposition). Alternatively, the shaft 62 and the working area 63 may consist of a single-piece material component without joint- or connecting zone.

Figure 12:
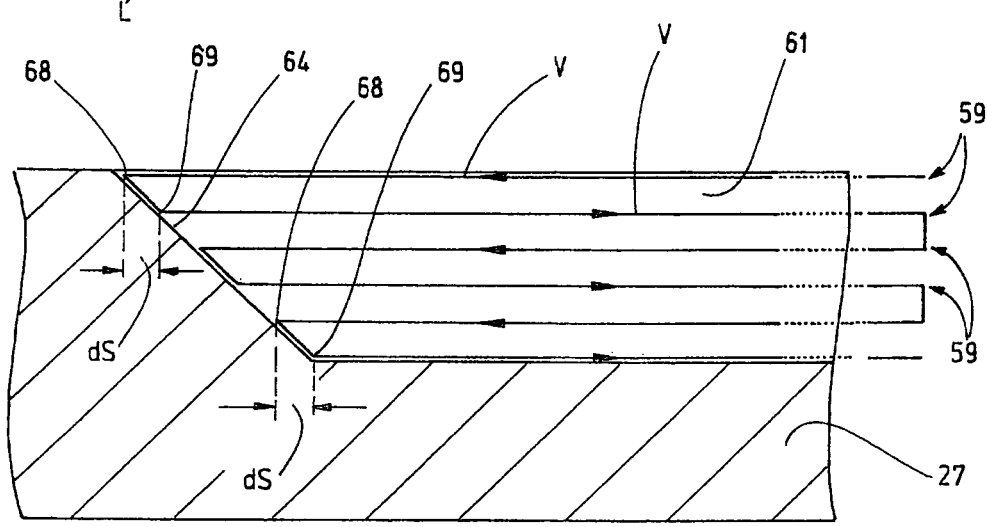
FIG. 12 is a blank as shown in FIGS. 10 and 11 in a longitudinal cross-section in the area of the chip groove end at the shaft and schematically the relative movement between the blank and the pulse surface area.

In the area of the chip groove end 64 adjacent the shaft 62, the depth of the chip groove 61 becomes smaller as measured radially from the longitudinal axis L. The chip groove 61 may extend toward the chip groove end 64 for example in the form of a ramp. For forming the chip groove 61 with the ramp-like chip groove end 64, the pulse area 55 is moved several times over the blank 27 along the chip groove 61 to be formed as it is shown schematically in FIG. 12. With each movement of the pulse area 55 in a relative movement direction V an ablation layer 59 is removed. The ablation layers 59 are disposed on top of one another in a radial direction with respect to the longitudinal axis L. With the first relative movement of the pulse area 55 the material ablation occurs from the free end 67 of the blank 27 in a direction toward the shaft end 64. When the chip groove end 64 is reached, the direction of movement of the relative movement between the impulse area 55 and the blank 27 must be reversed. During this movement reversal, the laser beam impulses 24 are switched off. The laser beam impulses are switched on again only after the relative movement direction V has been reversed and a displacement dS between the end 68 of this removed ablation layer and the start 69 of the new ablation layer 59 in the direction of the chip groove has been reached. The amount of the displacement dS depends on the desired pitch of the groove bottom at the shaft-side end of the groove 64. When the pulse area 55 moves from the shaft-side end of the chip groove 64 to the free end 67 the reversal of the direction of this relative movement occurs only when the pulse area 55 has left the blank 27. Upon the reversal of the direction of movement at the free end 67 switching off of the laser impulses 24 is not necessary. The displacement dS between the end 68 of an ablation layer and the start 69 of the subsequent ablation layer may be dependent on the depth of the groove—different in length when a changing pitch of the groove base in the area of the shaft-side chip groove end 64 is to be achieved.

In the exemplary embodiment in a first method step according to FIG. 7, two chip grooves 61 are formed. The cross-sectional shape of the blank 27 obtained thereof in the marking area 63 is radially symmetrical with respect to the longitudinal axis L.

In a second, optional, method step according to FIG. 8, there is a material ablation at the outside 70 adjacent the chip groove 61 to be formed. In the exemplary embodiment a segment of the original shell surface of the cylindrical blank 27 is ablated radially inwardly which results in a clearing recess 71. Measuring in the radial direction relative to the longitudinal axis L the ablation depth is constant. The pulse area 55 is moved along the longitudinal axis L of the blank 27 several times in the process. The ablation layers are therefore disposed in radial direction on top of one another.

The forming of the clearing recess 71 may be necessary or expedient in order to reduce the material ablation required for the subsequent formation of the cutting edge 60. This may be the case, for example, for the establishment of large free angles. If the chip grooves 61 are very large in circumferential direction or if there are sufficient chip grooves 61, the formation of the clearing recess 71 at the outside 70 in accordance with the second method step provided herein may be omitted.

Subsequently, in a third method step (FIG. 9) the at least one cutting edge 60 is produced. In the exemplary embodiment described herein two cutting edges 60 are provided. During the generation of the cutting edge 60, the clearing space 72 is formed. The clearing space 72 is provided between the clearing recess 71 and the chip groove 61. The chip guide area 73 is provided next to the cutting edge 60 in the chip groove 61. The chip guide area 73 has already been formed with the manufacture of the formation of the chip groove 61.

During the manufacture of the clearing space 72 or, respectively, the cutting edge 60 the relative movement between the pulse area 55 and the blank 27 is never zero as long as at least a part of the pulse area 55 reaches the surface 26 of the blank 27. In this connection, very planar edges and areas are formed. In particular, in the manufacture of the cutting edge 60 of the cutting tool, a smooth planar course is very important.

During the manufacture of the cutting edge 60, by means of the positioning arrangement 30, an inclination angle $\alpha$ between the beam direction R of the laser beam impulses 24 and a plane F in which the clearing space 72 is disposed, can be established. With a curved surface contour of the clearing space 72, the plane F is the longitudinal plane to the area being worked by the pulse area 55. The inclination angle $\alpha$ is predetermined by the control unit 29 and may be changed during machining. For example, the inclination angle $\alpha$ may be adapted to the material of the blank 27 to be machined.

In a further optional method step, following the manufacture of the cutting edge or, respectively, edges 60, chip guide steps 75 can be formed in the chip guide area 73 along the cutting edge 60 in order to improve the braking off of the chips during machining operations (FIG. 18). Furthermore, it is possible to maintain in the area of the original outer surface of the blank 27 a support chamfer 76 which is disposed on the same radius around the longitudinal axis L as the cutting edge 60 or slightly below. The support chamfer 76 is provided with a micro-structure. In particular, the support chamfer is provided at its radially outer surface with several concave recesses 77 in which cooling lubricant can collect during operation of the tool. In this way, friction forces can be reduced and the life of the tool can be prolonged. In FIG. 17, these recesses are schematically shown exaggerated in size.

The ablation rate for an ablation layer 62 can be varied by the intensity I of the laser beam impulse 24 during the manufacture of the tool. For example, the intensity I may be larger during the manufacture of the chip groove 61 and/or during the manufacture of the clearing recess 71 than during the manufacture of the cutting edge 60 and the clearing space 72. The layer thickness of the ablation layer 59 is correspondingly changed. Also, other parameters as, for example, the relative speed between the pulse area 55 and the blank 27 may be set to be different during different method steps since the requirements for evenness of an edge course or a surface are different. In the chip groove 61a large degree of unevenness can be tolerated than at the cutting edge 60.

The positioning arrangement 30 and/or the focusing lens system 28 ensure that after removal of an ablation layer 59, the focusing position is adapted to the next ablation layer 59, since, by the removal of an ablation layer the distance between the surface 26, of the blank 27 and the laser head 19 is changed by the layer thickness of the ablation layer 59 removed. This is adjusted at the end of each ablation layer 59 removal.

The invention resides in a method and an apparatus for the manufacture of a tool from a blank 27, in particular, a rotational tool which rotates about its longitudinal axis L. The rotational tool includes at least a cutting edge 60 and a chip groove 61. Preferably, the rotational tool is in its working area 63 in a cross-sectional view point symmetrical with respect to the longitudinal axis L. Its working area 63 is manufactured exclusively by a laser machining apparatus 20 from a cylindrical blank 27. The laser machining apparatus 20 generates via a laser scanner a pulse area 55 of, for example, oblong shape. The laser beam impulses 24 follow within the pulse area 55 a predetermined pulse path B with a multitude of impact locations 25. This pulse area 55 is moved like a tool along the surface 26 of the blank 27. In this process, the chip groove 61 and subsequently the cutting edge 60 are machined by sublimation of the material from the blank 27. The relative movement between a tool support 18 and the laser head 19 supplying the laser beam impulses 24 is achieved by a positioning arrangement 30 including several axes. The operating parameters during the manufacture of the chip groove 61 are different from the machining parameters during the manufacture of the cutting edge 60. As machining parameters the intensity I of the laser beam impulses 24 and/or the relative speed between the pulse area 55 and the blank 27 and/or the impulse frequency f and/or the size of the pulse area 55 may be provided via the control unit 29.

LISTING OF REFERENCE NUMERALS 18 tool support
19 laser head
20 laser machining apparatus
21 pulsed laser
22 pulsed laser beam
23 redirecting arrangement
24 laser beam impulse
25 impact location
26 surface area of 27
27 blank
28 focusing lens system
29 control unit
30 positioning arrangement
31 base element
32 first guide track
33 first carriage
34 second guide track
35 second carriage
36 first pivoting arrangement
37 first pivot axis
38 second pivoting arrangement
39 second pivot axis
40 third guide track
41 third carriage
42 upper part of 41
43 laser beam duct
43a first duct section
43b second duct section
43c third duct section
44a first redirecting mirror
44b second redirecting mirror
45 process gas supply
46 process gas suction device
47 accommodation area
48 vacuum chamber
49 suction line
50 vacuum pump
51 entrance location
52 process gas nozzle
55 pulse area
56 crater
57 path section
59 ablation layer
60 cutting edge
61 chip groove
62 shaft
62' (free surface) shaft
63 working area
64 chip groove end
65 impulse series
66 arrangement for beam homogenization
67 free end of 27
68 end of 59
69 start of 59
70 outside
71 clearing recess
72 clearing space
73 chip guide area
75 chip guide step
76 support chamfer
77 concave recess
$\alpha$ inclination angle
A distance
B pulse path
D diameter
dS displacement
E end point
f impulse frequency
F plane
I intensity
L longitudinal axis of 27
P process gas stream
R radiation direction
S starting point
V direction of relative movement
x first direction
y third direction
z second direction

What is claimed is:

1. Laser machining apparatus for the manufacture of a tool from a blank (27), comprising:
    a laser (21) for generating laser beam impulses (24);
    a laser head (19) including a redirecting arrangement (23) for directing the laser beam impulses (24) of the laser (21) onto a plurality of impact locations (25) disposed along a predetermined pulse path (B) on the surface (26) of the blank (27) spaced a predetermined distance (A) from one another within a predetermined pulse area (55) moving along the surface (26) to form an ablation layer (59) and successive ablation layers (59), the predetermined pulse path (B) being cyclical and having a plurality of cycles during the movement of the predetermined pulse area (55) along the surface (26) and the predetermined pulse path (B) having a starting position (S) and an end position (E) during each of said cycles, the redirecting arrangement (23) for resetting the laser beam impulses (24) at the starting position (S) upon the laser beam impulses reaching the end position (E); and,
    a positioning arrangement (30) for providing a continuous relative movement between the blank (27) and the predetermined pulse area (55) during the formation of each of the ablation layers (59) for generating a chip groove (61) and a cutting edge (60) on the blank (27), the redirecting arrangement (23) for providing the movement of the laser beam impulses (24) along the predetermined pulse path (B) during each of said cycles at times corresponding, at times transverse, and at times opposite with respect to the continuous relative movement as the laser beam impulses (24) proceed along the predetermined pulse path (B).

2. Laser machining apparatus according to claim 1, wherein the positioning arrangement (30) has a pivot axis (39) which coincides with the longitudinal axis (L) of a cylindrical blank (27) to be machined.

3. Laser machining apparatus according to claim 1, further comprising a beam homogenization arrangement (66) for beam-homogenizing the laser beam impulses (24).

4. Laser machining apparatus according to claim 1, further including a control unit (29) in controlling relationship with positioning arrangement (30) for determining an angle of inclination ($\alpha$) between the optical axis (R) of the laser head (19) radiating the laser impulses (24) and a surface area or edge (60) to be formed on the blank (27) and adjusting the angle of inclination (α) accordingly.

5. Laser machining apparatus according to claim 4, wherein the control unit (29) further controls the positioning arrangement (30) for changing the inclination angle (α) during the machining of the blank (27).

6. Laser machining apparatus according to claim 4, wherein the control unit (29) further controls the laser head (19) for varying the intensity (I) of the laser impulses (24) during ablation of the material of the blank (27).

7. Laser machining apparatus according to claim 1, wherein the redirecting arrangement (23) further is for directing the laser impulses (24) onto the impact locations (25) of the pulse area (55) in a predetermined order.

8. Laser machining apparatus according to claim 1, further including a process gas supply (45) for generating a process gas stream (P) directed onto the blank (27) in particular in a direction extending at an angle with respect to the pulse area (55).

9. Laser machining apparatus according to claim 8, wherein the process gas supply (45) further includes at least one process gas nozzle (52) each of the at least one gas nozzle (52) for directing a partial stream of the process gas steam (P) in a predetermined direction onto a machining area in the vicinity of the pulse area (55).

10. Laser machining apparatus according to claim 1, further including a laser beam duct (43) in operative arrangement between the laser (21) and the laser head (19) for directing the laser beam impulses (24) to the laser head (19).

11. A method for the manufacture of a tool with a contour (60, 61) from a blank (27), comprising the following steps:
providing the blank (27);
generating laser beam impulses (24) and directing the laser beam impulses (24) onto spaced predetermined impact locations (25) along a predetermined pulse path (B) within a predetermined pulse area (55) on surface (26) of the blank (27) moving along the surface (26) forming successive ablation layers (59) with the predetermined pulse path (B) being cyclical and having a plurality of cycles during the movement of the predetermined pulse area (55) along the surface (26) and the predetermined pulse path (B) having a starting position (S) and an end position (E) during a cycle;
resetting the laser beam impulses (24) at the starting position (S) upon the laser beam impulses reaching the end position (E); and,
executing a continuous relative movement between blank (27) and the pulse area (55) during the formation of each of the ablation layers (59) for forming on the blank (27) a chip groove (61) and a cutting edge (60) while moving the laser beam impulses (24) along the predetermined pulse path (B) during each of said cycles at times corresponding, at times transverse, and at times opposite with respect to the continuous relative movement.

12. The method according to claim 11, further comprising the step of the material of the blank (27) is ablated layer-by-layer in several ablation layers (59) as determined by the pulse area (55).

13. The method according to claim 11, wherein the blank (27) has a cylindrical shape and the tool to be manufactured is a rotating tool.

14. The method according to claim 11, further comprising the step of first at least one chip groove (61) is formed onto the blank (27) and subsequently in another step at least one cutting edge (60) is formed at the outside (70) of the blank (27).

15. The method according to claim 14, further comprising after the step of forming of the chip groove (61) and before the step of forming of the cutting edge (60) an additional step of forming a clearing recess (71) adjacent a clearing space (72) to be established by the forming of the cutting edge (60).

16. The method according to claim 12, wherein the size of the pulse area (55) is changed during the step of formation of the chip groove (61).

17. The method according to claim 12, wherein the tool is manufactured from the provided blank (27) it being rotational symmetrical with a maximum diameter of less than 2 millimeters and being machined exclusively by laser beam pulses (24).

18. The method according to claim 14, further comprising an additional step, where following the step of forming the at least one cutting edge (60), at least one chip guide step (75) is formed in a chip guide area (73) along the at least one cutting edge (60), whereby the braking off the chips is improved during machining operations of the tool.

19. The method according to claim 14, further comprising an additional step of maintaining in the original outer surface of the blank (27) a support chamfer (76) disposed on the same radius around a longitudinal axis (L) as the cutting edge (60) or shortly below and providing the support chamfer (76) at its radially outer surface several concave recesses (77), whereby cooling lubricant can collect in the concave recesses (77) during operation of the tool to reduce friction forces and extend the life of the tool.

20. Laser machining apparatus for the manufacture of a tool from a blank (27), the blank (27) including a shaft (62) having a monolithic extension area (63) or the blank (27) having a monotlithic extension area (63) thereon and a shaft (62) operatively connected to the blank (27), the tool after manufacture including in the monolithic extension area (63) a chip groove (61) including a ramp-like chip groove end (64) comprising:
a laser (21) for generating laser beam impulses (24);
a laser head (19) including a redirecting arrangement (23) for directing the laser beam impulses (24) of the laser (21) onto a plurality of impact locations (25) disposed along a predetermined pulse path (B) on the surface (26) of the blank (27) spaced a predetermined distance (A) from one another within a predetermined pulse area (55) moving along the surface (26) to form an ablation layer (59) and successive ablation layers (59), the predetermined pulse path (B) being cyclical and having a plurality of cycles during the movement of the predetermined pulse area (55) along the surface (26) and the predetermined pulse path (B) having a starting position (S) and an end position (E) during each of said cycles, the redirecting arrangement (23) for resetting the laser beam impulses (24) at the starting position (S) upon the laser beam impulses reaching the end position (E);
a positioning arrangement (30) for providing a continuous relative movement in direction (V) between the blank (27) and the predetermined pulse area (55) during the formation each of the ablation layers (59) for generating the chip groove (61) on the blank (27), the redirecting arrangement (23) for providing the movement of the laser beam impulses (24) along the predetermined pulse path (B) during each of said cycles at times corresponding, at times transverse, and at times opposite with respect to the continuous relative movement as the laser beam impulses (24) proceed along the predetermined pulse path (B); and,
a control unit (29) in controlling relationship with the positioning arrangement (30) and the laser head (19), the control unit (29) for controlling the movement between the pulse area (55) and the blank (27) and movement of the laser beam impulses (24) within the pulse area (55) and for reversing the direction (V) at an end of the ramp-like chip groove (64) to be formed in blank (27) and switching off the laser beam impulses (24) during the reversal of direction (V) and for reversing direction (V) at a free end (67) to be formed without switching off the laser beam impulses (24).

\* \* \* \* \*